Figure 1:
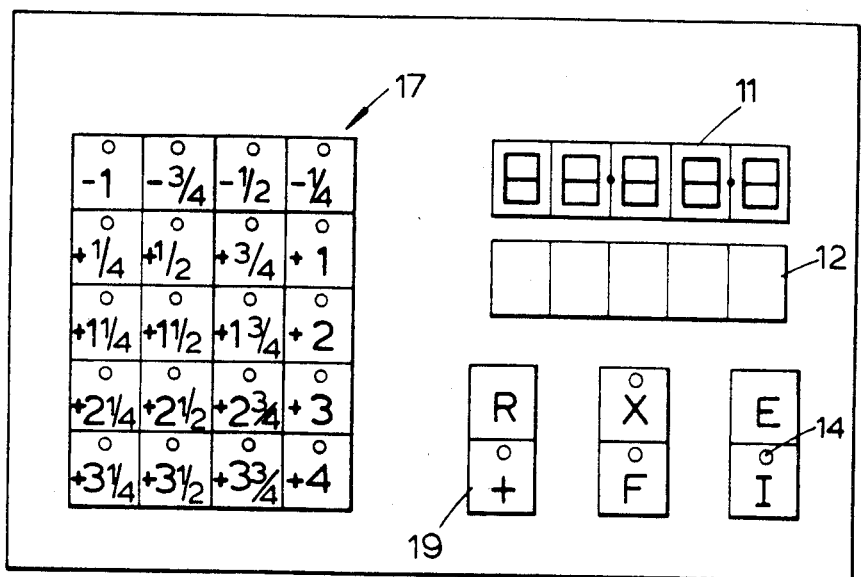

United States Patent [19]

Nocon

[11] Patent Number: 4,524,290
[45] Date of Patent: Jun. 18, 1985

[54] PHOTOGRAPHIC TIMER

[76] Inventor: Gene Nocon, Studio A, Floral Hall, Covent Garden, London WC2, England

[21] Appl. No.: 514,805
[22] PCT Filed: Nov. 9, 1982
[86] PCT No.: PCT/GB82/00320
§ 371 Date: Jun. 23, 1983
§ 102(e) Date: Jun. 23, 1983
[87] PCT Pub. No.: WO83/01846
PCT Pub. Date: May 26, 1983

[30] Foreign Application Priority Data

Nov. 12, 1981 [GB] United Kingdom ............... 8134158
Jul. 16, 1982 [GB] United Kingdom ............... 8220677

[51] Int. Cl.³ .......................................... H01H 43/00
[52] U.S. Cl. .................................... 307/141.4; 355/69
[58] Field of Search ........................ 355/35–38, 355/68–70, 67, 71; 307/590, 592, 593–598, 141, 141.4, 141.8; 328/131.1, 130.1, 129; 315/360

[56] References Cited

U.S. PATENT DOCUMENTS 3,611,159 10/1971 Florsheim, Jr. et al. .......... 355/69 X
3,832,054 7/1974 Sable ................................. 355/35
4,035,661 7/1977 Carlson .............................. 307/141

FOREIGN PATENT DOCUMENTS 2945166 5/1981 Fed. Rep. of Germany.
2065903 7/1981 United Kingdom.

OTHER PUBLICATIONS

Electronique Industrielle, No. 10, Feb. 15, 1981, (Canterbury, GB), P.I.; "Timer pour Chambre Noire", pp. 43–44.

Primary Examiner—L. T. Hix
Assistant Examiner—Della J. Rutledge
Attorney, Agent, or Firm—Dennison, Meserole, Pollack & Scheiner

[57] ABSTRACT

A time switch comprising: a clock (20) and a time counter (15) controlled by the clock and means (14,19) for starting the counter (15); input (12) and memory (13) means for entering and storing a base running time; a plurality of further input means (17) each associated with logic (18) and memory (13) means for entering a multiplier and calculating and storing the particular multiple of said base running time; the logic means (18) also being controlled by the clock (20) and being arranged successively to stop the counter (15) at the expiration of each multiple of the base running time stored in said memory (13), and to stop said clock at the end of the base running time; display means (11) for displaying the entered base running time, and, during a run, the elapsed running time; and switch means controlled to function only when said counter is running.

15 Claims, 2 Drawing Figures

PHOTOGRAPHIC TIMER

This invention relates to a time switch.

A time switch according to the present invention may be used for controlling any desired apparatus but is particularly, though not exclusively, useful for producing photographic prints. The switch may be used in the production of colour prints from negatives or diapositives, but it has particular advantages in the production of monchrome prints, and the following description of the invention will accordingly be largely confined to that field of use.

Time switches for controlling operation of an apparatus, for example illumination from a photographic enlarger, for a single preselected time period are of course very well known.

In the production of monochrome prints, it is often desired to render some region of the image denser or less dense than other regions and this is accomplished by over- or under-exposing those image regions by comparison with a base exposure time.

Accordingly time switches have been proposed with a programmable memory which are arranged to interrupt an exposure run after a succession of previously entered times so that after the shortest of those times, appropriate regions of the photosensitive print material can be shaded so that they are not further exposed. Such switches present considerable advantages over a single period timer, but they are not wholly satisfactory for two main reasons. Firstly, each time period requires separate estimation or calculation and entry, and secondly, if it is desired to reproduce a print using a different base exposure running time, then all the other time periods again require individual calculation and entry.

It is an object of the present invention to provide a time switch especially suitable for photographic purposes in which these disadvantages are alleviated.

According to the present invention there is provided a time switch characterised in that it comprises: timer means and means for starting the timer means; input and memory means for entering and storing a base running time; a plurality of further input means each associated with logic and memory means for entering a multiplier and calculating and storing the particular multiple of said base running time; means for successively stopping the timer means at the expiration of each stored multiple of the base running time, and at the end of the base running time; timer controlled switch means; display means for displaying the entered base running time, and, during a run, the elapsed running time.

A time switch according to this invention has the advantage that only one time period, the base exposure running time, need be entered as such. Other time periods are simply entered as desired as multiples of that base running time. This is of very considerable practical convenience. The invention has the further advantage when used for photographic enlargement that if it is desired to reproduce the tonal quality of a print using a different base running time, for example in a print of different image size, then all that is necessary to alter is the base running time. The same multiples of the base running time will give the same tonal balance to the prints made.

In the most preferred embodiments of the invention, said multipliers are powers of 2. In other words, said logic and memory means are arranged for the calculation and storage of running times which are f/stop number multiples of the base running time. A doubling or halving of the base exposure running time is an increase or decrease respectively of 1 f/stop. It is a fact that photographers and photographic printers are accustomed to thinking of exposure time variations in terms of f/stops and those experienced in that art are familiar with the difference in print density which will be the result of a variation in exposure of a given number of f/stops, that is, the result of multiplying the exposure time by a given power of 2.

The interval between successive multipliers is preferably at most 2 raised to the power $\frac{1}{2}$, that is to say, the square root of 2. This allows finer control of exposure running times than when operating with a larger interval.

In the most preferred embodiments, said interval is 2 raised to the power $\frac{1}{4}$, that is, the fourth root of 2 or $\frac{1}{4}$ f/stop. It has been found that such an interval allows sufficiently fine control over variations in print density for almost all practical purposes.

Advantageously, said powers of 2 include $-1$ and $+3$ and preferably they include $-1$ and $+4$. The adoption of one or other of these features allows variations in the base running time of $\frac{1}{2}$ to 8 times or $\frac{1}{2}$ to 16 times respectively thus permitting exposures to be reduced by up to 1 f/stop and increased by up to 3 or 4 f/stops respectively.

Preferably, means is provided for entering a said calculated multiple of said base running time as a revised base running time. This simplifies the entry of a new base running time in cases where it is a said multiple of the previously entered base running time. This is of considerable practical convenience when making photographic prints of different sizes especially when said interval between successive multipliers is 2 raised to the power $\frac{1}{4}$ ($\frac{1}{4}$ f/stop), as will be adverted to later in this specification, but briefly stated, the correction of exposure required for changing from one to another of the most commonly available sizes of photographic printing paper is a whole number of $\frac{1}{4}$ f/stops.

It is convenient for said switch means to be adapted to transmit power from a source while said timer is running, as is preferred.

Preferably a foot-operable switch is provided for starting the timer means. The user, in particular the photographic printer, can then have both hands free to perform other tasks, such as shading selected areas of the image being printed.

Said time switch is preferably connected to lighting means for controlling illumination given thereby. Such control may be effected by switching the light on or off as the case may be, but in more preferred embodiments of the invention, said time switch is connected to control operation of a shutter of said lighting means. When making brief time exposures in photographic printing, the warm-up period of the light source used can in some circumstances have a significant effect on the exposure. Any such problems are substantially avoided by having the light source switched on throughout the exposure running time and by controlling illumination by means of a shutter.

Said lighting means is preferably a photographic enlarger.

Figure 2:
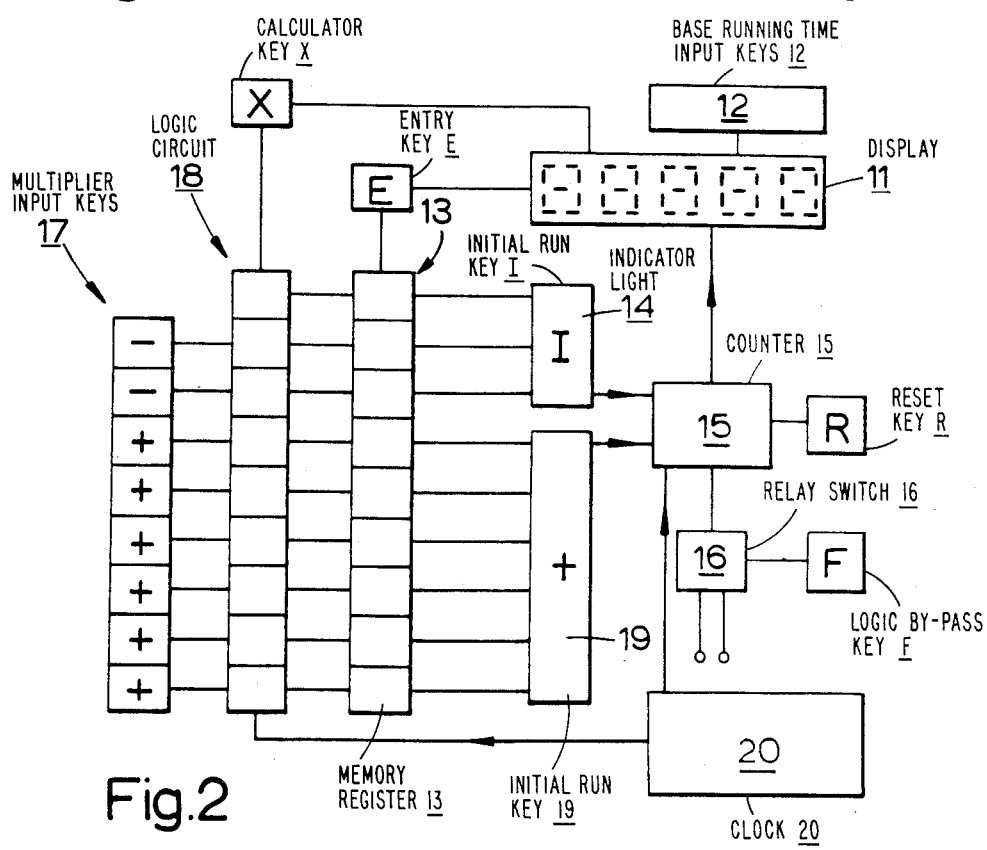

A preferred embodiment of the invention will now be described by way of example only with reference to the accompanying diagrammatic drawings in which:

FIG. 1 is a view of a control panel for a time switch in accordance with the present invention; and FIG. 2 is a schematic block diagram of the operation of such a time switch.

In FIG. 1, a time switch control panel 10 comprises a display 11 for displaying times for example in minutes, seconds and tenths of seconds set into the display 11 by means of a row of input keys 12.

In FIGS. 1 and 2, a base exposure running time set into the display 11 by means of its input 12 is fed to an address in a memory register (13 in FIG. 2) by depressing an entry key E, which at the same time enables run initial key I. The enabled/disabled state of key 1 may be indicated by a light 14 in FIG. 1. In the simplest mode of operation of the time switch, run initial key I is depressed to start a time counter 15 in FIG. 2 for the entered base running time. At the start of the run, the display 11 reverts to zero and then displays the elapsed running time. While the counter 15 is running, a signal is passed to a relay 16 (FIG. 2) to close a switch so that it will transmit power, for example from a mains source to a photographic enlarger (not shown).

At the end of the entered base running time, the counter stops and the switch controlled by the relay 16 is opened. The initial key I may then be re-enabled by reset key R.

The control panel 10 includes an array of further switches 17, suitably of the press on/press off type which are marked in powers of 2 ranged from −1 to +4 with intervals of ¼, but omitting zero which would correspond to a multiplier of 1.

Depression of any of these keys 17 actuates logic means 18 (FIG. 2) to multiply the base running time entered in memory register 13 by the appropriate multiplier, the selected power of 2, and to feed this to its own address in the memory register 13.

The keys 17 marked with a negative power are connected to the initial key I and those marked with a positive power are connected so that when any is depressed it enables an "increase" key 19. The states of keys 17 and 19 are also indicated by lights 14.

The time counter 15 and all logic operations are synchronized and advanced at precise time intervals under the control of a clock 20 which may be a quartz crystal oscillator or other conventional time base known in the art.

The arrangement is such that in operation a run is started by pressing initial key I whereafter the logic circuits 18 and the counter 15 will run to the shortest running time which has been set in the memory 13. This shortest time will be either the selected base running time where no negatively marked key 17 has been pressed or it will be that fraction of the base running time corresponding to the selected negative power of 2. When this shortest time has elapsed, the counter 15 will be stopped by the logic circuits and the switch controlled by the relay 16 opened. If the shortest time is less than the base running time, the run can be continued by again pressing the initial key I. This procedure can continue until the total elapsed time is equal to the base running time, whereafter continuation of the run is effected by use of the increase key 19 if this is enabled by pressure of a positively marked key 17.

After completion of the run, the counter 15 can be reset to zero and the display to the entered base running time by pressing the reset key R. The run can then be repeated with or without making any alteration to the keys 17 which have been actuated or to the base running time.

If it is desired to alter the base running time, this may simply be done by entering a new time using input key 12 and entry key E, leaving the multipliers set on keys 17 as they were before if desired.

Alternatively, it may be desired to enter a new base running time which is different from the old by a multiple of ¼ f/stops.

In such a case, the desired multiplier key 17 may be depressed and then calculator key X may be actuated to cause the desired multiple of the old base running time to appear in the display 11. This multiple may then be entered as the new base running time by means of the entry key E.

The unit is provided with a mains on/off switch 30, and with a logic by-pass switch F which may be actuated to close the relay 16 continuously, for example when focussing an enlarger to which the time switch is connected.

Optionally, but preferably, a pedal switch (not shown) is provided which combines the functions of the initial key I and the increase key 19 so that throughout a run an operator can have both hands free for other tasks.

The use of a time switch as described above gives considerable advantages in photographic printing, and its use in the making of a photographic print from a monochrome negative will now be described.

In the making of a print from a monochrome negative, the negative is inspected and a suitable print exposure time is estimated. This estimated exposure time is then entered as a base running time in the time switch. The negative is then loaded into the enlarger and the enlarger is focussed. A sheet of photosensitive printing material is appropriately positioned and the time switch is started by pressing the initiator key, or, when provided, the pedal switch, to operate the enlarger for the estimated base running time. The exposed printing material is then processed in the usual way to give a "straight" print.

If on the other hand it is desired to make a test strip exposure initially, the printer may enter a base running time and also enter multiples of that time, for example corresponding to −½, +½ and +1 f/stop. Then, given a base running time of, say, 8 seconds, the time switch would operate causing the enlarger to illuminate the printing material for an initial period of 5.7 seconds. A card would then be positioned to shade one quarter of the printing material and the timer restarted for a further exposure of 2.3 seconds. The card would be moved again so that half the printing material was masked and the timer restarted for a further 3.3 seconds exposure. Finally the card would be moved to cover three quarters of the printing material and the timer restarted to expose the remaining quarter of the material for a further 4.7 seconds. Thus four successive strips of the printing material would have been exposed for times of 5.6, 8, 11.3 and 16 seconds. The exposed printing material would then be processed in the usual way and from inspection a base running time can be selected to give a desired overall density to a "straight" print to be made.

It may be that the first, straight print is perfectly satisfactory, but it is usually the case that a better result can be achieved by varying the exposure of selected parts of the photo-sensitive printing material. Thus shadow detail can be increased and density reduced by underexposure in the enlarger, while undesired highlights can be reduced or eliminated and shadow areas can be deepened ob overexposure.

It is a fact that photographers and photographic printers are accustomed to thinking in varying exposure times by f/stop numbers and are familiar with the effects of reducing or increasing exposure by a particular number or fraction of f/stops. Accordingly on inspection of the straight print, the photographer or printer may decide that the appearance of the print could be improved by, say, lightening one shadow area by ½ f/stop and another by ¼ f/stop, and by darkening one highlight area by ¾ f/stop and another by 4 f/stops.

In such circumstances, the previously ascertained base running time is entered into the time switch and the mulitplier keys corresponding to −½, −¼, +¾ and +4 f/stops are pressed. If we suppose that the base running time selected was 11.3 seconds, the exposure will be halted after (total) elapsed times of 8, 9.5, 11.3, 19 and 180.8 seconds. After exposing the whole of the photosensitive printing paper for 8 seconds, the printer will then shade the first shadow area of the projected image while the remainder of the paper is exposed for a further 1½ seconds. After shading both the shadow areas, the timer is again restarted so that the rest of the print is exposed for a total of 11.3 seconds. Then all but the two highlight areas are shaded and the timer is again restarted so that the total exposure time is raised to 19 seconds. Finally all but the second highlight area is shaded and the timer is restarted to burn out that second highlight and complete the exposure. The latent positive image produced is then processed in the same way as the original straight print to produce the final print.

It will be appreciated that the optimum base exposure time selected may have to be varied as dark-room conditions vary. For example a different batch of printing material may be used, or the concentration of the developer, or its temperature may be different, for example when making a repeat print at a later date. Of course if a different enlarger is used this may also affect the optimum base exposure time. However once the new base exposure time is selected, the different exposure times will remain −½, −¼, 0, +¾ and +4 f/stops different from the new optimum base exposure time, so that once that new time is settled, substantially identical repeat prints can be made without any further calculation.

This represents a considerable advantage over previously known time switches for dark-room use in which it has been necessary to calculate and enter each individual desired elapsed time so that if the base exposure time required to be altered it was necessary to recalculate and re-enter all other exposure times.

The invention also permits convenient and economical production of large format prints. For example it might be desired to produce prints of 16″×20″ (40.6×50.8 cm) image size for exhibition or other purposes. In such a case, all preliminary work, including the production of a first final print can be carried out using for example 8″ by 10″ (20.3×25.4 cm) or even 5″×8″ (12.7×20.3 cm) printing material. The tonal balance of such a smaller print can then readily and accurately be reproduced in the larger size by adjusting the base exposure time.

As is well known, the exposure time required for prints of different sizes is for practical purposes in the ratio of the areas occupied by the image, other conditions being the same.

The following table illustrates the ratios of the areas of several widely available sizes of photographic printing papers:

| Paper Size | 5 × 8<br>12.7 ×<br>20.3 | 8 × 10<br>20.3 ×<br>25.4 | 9½ × 12<br>24.1 ×<br>30.5 | 12 × 16<br>30.5 ×<br>40.6 | 16 × 20 Ins<br>40.6 ×<br>50.8 cm |
|---|---|---|---|---|---|
| 5 × 8 | 1.0 | 2.0 | 2.85 | 4.8 | 8.0 |
| 8 × 10 | 0.5 | 1.0 | 1.425 | 2.4 | 4.0 |
| 9½ × 12 | 0.351 | 0.702 | 1.0 | 1.684 | 2.807 |
| 12 × 18 | 0.208 | 0.417 | 0.594 | 1.0 | 1.667 |
| 16 × 20 | 0.125 | 0.25 | 0.358 | 0.6 | 1.0 |

It is worth noting that to an accuracy within 1%:
  1.425 equals 1.414 corresponding to +½ f/stop
  1.667 and 1.684 equal 1.682 corresponding to +¾ f/stop
  2.4 equals 2.378 corresponding to +1¼ f/stops
  2.807 and 2.85 equal 2.828 corresponding to +1½ f/stops
  4.8 equals 4.757 corresponding to +2¼ f/stops.

Accordingly the table may be rewritten with f/stop exposure correction factors as follows, assuming that the image produced is to occupy the same proportion of the area of the different sizes of printing material.

| Paper Size | 5 × 8 | 8 × 10 | 9½ × 12 | 12 × 16 | 16 × 20 |
|---|---|---|---|---|---|
| 5 × 8 | 0 | +1 | +1½ | +2¼ | +3 |
| 8 × 10 | −1 | 0 | +½ | +1¼ | +2 |
| 9½ × 12 | −1½ | −½ | 0 | +¾ | +1½ |
| 12 × 16 | −2¼ | −1¼ | −¾ | 0 | +¾ |
| 16 × 20 | −3 | −2¼ | −1½ | −1 | 0 |

Suppose that a printer made a print occupying substantially the whole of a 9½″×12″ sheet of printing paper with a base exposure time of 11.3 seconds adjusted for certain regions by −½, −¼, +¾ and +4 f/stops as referred to above, and now desires to reproduce this print to occupy substantially the whole of a 16″×20″ sheet. From reference to the second table above, the printer knows that each exposure time must be increased by 1½ f/stops.

Using the embodiment of the present invention as described above with the base exposure time of 11.3 seconds entered and displayed, the printer may press the +1½ mulitplier key and the calculate key whereafter the revised time of 32.0 seconds will appear in the display. This may then be entered as the revised base exposure time. On re-entry of the −½, −¼, +¾ and +4 multipliers exposure will be halted after total elapsed times of 22.7, 26.9, 32, 53.8 and 512 seconds, each 1½ f/stops greater than the corresponding elapsed time used for making the smaller print. Accordingly, under similar processing conditions, the larger print will be found to be correctly exposed and of the same tonal balance as the smaller print.

I claim:

1. A timing device comprising a clock and a counter for counting timing pulses emitted by the clock;
  means for establishing a base running time for said clock; a memory register having a plurality of addresses for holding digital values;
  entry means for entering a set base running time into an address in said memory register;
  an array of switches each of which is associated with a different multiplier value, at least one of said multiplier values being a negative power of a selected number and at least some of said multiplier values being positive powers of said selected number;

logic means for calculating product values representing the products of multiplier values associated with selected ones of said array of switches and the entered base running time and means operable to store said product values each in a respective selected address in said memory register;

manually operated start means for starting the counter, running of said counter stopping whenever the count therein reaches a value equal to a value held by a selected address in the memory register;

display means for displaying the set base running time and, during operation, the elapsed running time;

and switch means operable to close only when said counter is running;

and reset means for resetting the counter to zero.

2. A timing device according to claim 1, and including means for enabling the set base running time to be replaced by a new running time being the product of the previously entered base running time and a multiplier selected by operation of selected switch means of said array of switches.

3. A timing device according to claim 1, wherein the switch means is controlled by a relay actuated selectively, either by the counter or by an override input means.

4. A timing device according to claim 1, wherein said multipliers are powers of 2.

5. A timing device according to claim 4, wherein the interval between successive multipliers is at most 2 raised to the power $\frac{1}{2}$.

6. A timing device according to claim 5, wherein said interval is 2 raised to the power $\frac{1}{4}$.

7. A timing device according to claim 4, wherein said powers of 2 include $-1$ and $+3$.

8. A timing device according to claim 1, wherein said switch means is adapted to transmit power from a source.

9. A timing device according to claim 1, wherein said start means comprises a foot-operable switch.

10. A timing device according to claim 8 wherein said switch means is adapted to be connected to lighting means for controlling illumination given thereby.

11. A timing device according to claim 10 wherein said switch means is adapted to be connected to control operation of a shutter of said lighting means.

12. A timing device according to claim 10 wherein said lighting means is associated with a photographic enlarger.

13. A time switch comprising a clock and a counter for counting timing pulses emitted by the clock;

means for setting a base running time; a memory register having a plurality of addresses for holding digital values;

entry means for entering a set base running time into an address in said memory register;

an array of switches each of which is associated with a different multiplier value;

logic means for calculating values representing the products of multipliers associated with operated ones of said array of switches and the entered base running time and storing said product values in addresses in said memory register;

manually operated start means for starting the counter, running of said counter stopping whenever the count therein reaches a value equal to a value held by an address in the memory register;

display means for displaying the set base running time and, during a run, the elapsed running time;

switch means controlled to close only when said counter is running;

means for enabling the set base running time to be replaced by a new running time being the product of the previously entered base running time and a multiplier selected by operation of any one of said array of switches;

and reset means for resetting the counter to zero.

14. A time switch according to claim 13 wherein at least some of said multiplier values are less than unity.

15. A time switch according to claim 13 wherein at least one of said multiplier values is less than unity and wherein at least some of said multiplier values are greater than unity.

* * * * *